United States Patent [19]

Rampel

[11] 3,711,331
[45] Jan. 16, 1973

[54] METHOD OF MAKING AN IMPROVED ELECTRODE FOR DISCHARGEABLE CELL

[75] Inventor: Guy Rampel, Gainesville, Fla.

[73] Assignee: General Electric Company

[22] Filed: April 27, 1970

[21] Appl. No.: 43,274

Related U.S. Application Data

[62] Division of Ser. No. 761,248, Sept. 20, 1968, abandoned.

[52] U.S. Cl. .................................................. 136/6
[51] Int. Cl. ........................................... H01m 35/00
[58] Field of Search........136/165, 164, 6, 19, 20, 24, 136/28, 29, 30–31, 34, 176, 76–78; 320/2, 13, 14

[56] References Cited

UNITED STATES PATENTS

| | | | |
|---|---|---|---|
| 2,850,555 | 9/1958 | Pucher et al. | 136/20 |
| 2,942,053 | 6/1960 | Baldwin, Jr. et al. | 136/6 |
| 3,031,517 | 4/1962 | Peters | 136/6 |
| 3,081,366 | 3/1963 | Belove | 136/6 |
| 3,201,279 | 8/1965 | Root | 136/6 |
| 3,353,998 | 11/1967 | Laugguth et al. | 136/6 |
| 3,359,138 | 12/1967 | Strauss | 136/120 |
| 3,424,618 | 1/1969 | Weilnbock | 136/6 |

*Primary Examiner*—Anthony Skapars
*Attorney*—Nathan J. Cornfeld, John P. Taylor, Frank L. Neuhauser, Oscar B. Waddell and Joseph B. Forman

[57] ABSTRACT

A method of making an improved electrode structure for rechargeable cells is provided. The current collector is positioned on an external surface of the electrochemically active material and that surface is placed adjacent a separator between the positive and negative electrode, thereby inhibiting deterioration of the separator which otherwise results from direct contact with the electrochemically active material of the electrode. Performance is improved and shelf life lengthened by slightly discharging the cell before storage, thereby placing a layer of the metal reduced from the electrochemically active material on the surface facing the separator adjacent the collector as a barrier between the active material of the electrode and the separator.

2 Claims, 4 Drawing Figures

PATENTED JAN 16 1973  3,711,331

INVENTOR.
GUY RAMPEL
BY
ATTORNEY

METHOD OF MAKING AN IMPROVED ELECTRODE FOR DISCHARGEABLE CELL

This application is a division of Applicant's copending application, Ser. No. 761,248, filed Sept. 20, 1968, and now abandoned, and assigned to the same assignee as the present invention.

BACKGROUND OF THE INVENTION

This invention relates to improvements in rechargeable cells. More specifically, the invention relates to a method of making an improved electrode structure for use in rechargeable cells.

In rechargeable cells, particularly those of the alkaline type, it is well known to place some type of porous non-conducting material between the positive and negative electrodes. This material, referred to as the separator, acts to prevent short circuits between the electrodes and allows a minimum space between electrodes, thereby making the cells more compact.

The proximity of the electrodes to the separator has, however, caused problems in that the electrochemically active material of the electrode may cause deterioration, over a period of time, of the separator. This process of deterioration, known as separator attack, may eventually lead to cell failure.

The problem of separator attack is particularly emphasized where rechargeable cells spend considerable time "on the shelf" prior to use. Separator attack is, therefore, a significant factor in determining the shelf life of a rechargeable cell.

SUMMARY OF THE INVENTION

It is an object of the present invention to reduce separator attack in a rechargeable cell.

It is a further object of the present invention to significantly increase the shelf life of a rechargeable cell.

Briefly, the present invention achieves the foregoing objects by keeping the electrochemically active material of the positive electrode out of direct contact with the separator.

DESCRIPTION OF THE DRAWINGS

Referring to FIG. 1 there is shown in symbolic form a rechargeable cell of the well-known type. Such a cell consists of a negative electrode 1 and a positive electrode 2. Interposed between the two electrodes is a separator 3 constructed of a porous non-conducting material which acts to provide physical and electrical separation between the positive and negative electrodes. The two electrodes 1 and 2 and the separator 3 are disposed within a suitable container 4 which is then filled with an electrolyte (not shown). If the cell is of the alkaline type the electrolyte may comprise, for example, potassium hydroxide (KOH). The electrodes may be constructed of any of the well known combinations such as, for example, nickel-cadmium or zinc-silver oxide ($Ag_2O$ or $AgO$, sometimes referred to as silver peroxide). The separator 3 may comprise any suitable porous material or may consist of layers of different materials such as for example, proceeding from the positive cell to the negative cell, Dynel (a vinyl chloride-acrylonitrile synthetic fiber), cellophane, and nylon.

Figure 1:
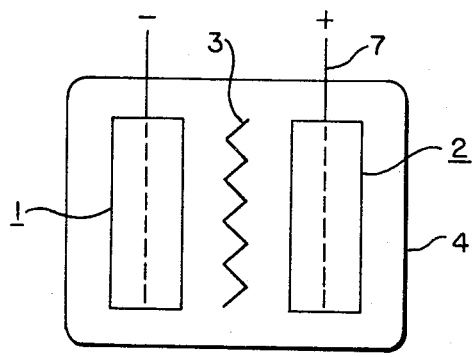
FIG. 1 is a symbolic representation of a rechargeable cell, showing its essential components.
Figure 2:
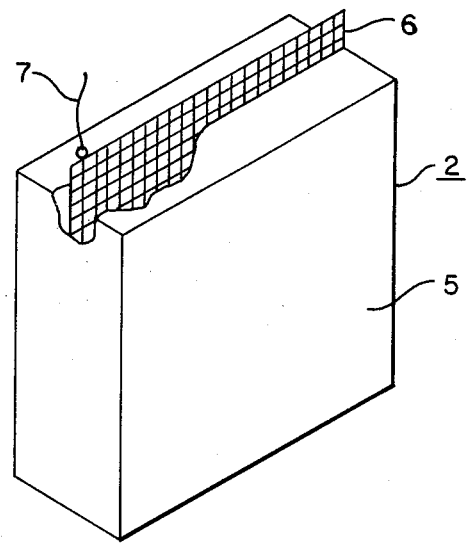
FIG. 2 illustrates a positive electrode of configuration shown by the prior art for use in a rechargeable cell.

The electrodes known in the prior art are often constructed as shown in FIG. 2. This electrode consists of some type of electrochemically active material 5 which is disposed about an electrically conductive current collector such as the mesh 6. If the rechargeable cell is a zinc-silver oxide cell, the mesh 6 may be formed of silver wires. A flexible lead 7 is connected to the current collector 6 so as to form the requisite electrical contact. As can be seen by reference to FIGS. 1 and 2, the electrochemically active material 5 is on the exterior surface of the prior art electrode and is therefore immediately adjacent the separator 3. As was pointed out above, the material used as the electrochemically active material 5 may tend to deteriorate the separator 3 and eventually lead to the failure of the cell by virtue of "separator attack." Separator attack is believed to occur by virtue of the electrochemically active material used in the positive electrode (such as the silver oxide in a zinc-silver oxide cell). It is postulated that this attack may be the result of migration of the metal ions from the positive electrode toward the separator.

Figure 3:
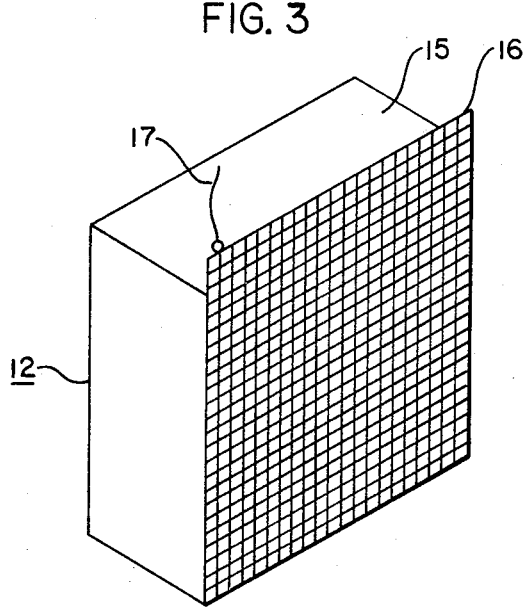
FIG. 3 illustrates a positive electrode constructed in accordance with the present invention.

Referring now to FIG. 3, there is shown the improved electrode structure constituting the present invention. As can be seen, the current collector 16 is positioned on an external surface of the electrochemically active material 15 as opposed to being placed in the center as is the case in the prior art electrode illustrated by FIG. 2. By placing the current collector 16 on the external surface of the electrode, and positioning the electrode within the cell so that the current collector side of the electrode is adjacent the separator, the current collector is capable of functioning as a barrier between the separator and the electrochemically active material of the positive electrode. Thus, for example, in a zinc-silver oxide cell, a metallic silver current collector is used and the separator is therefore in contact with metallic silver, not silver oxide.

Figure 4:
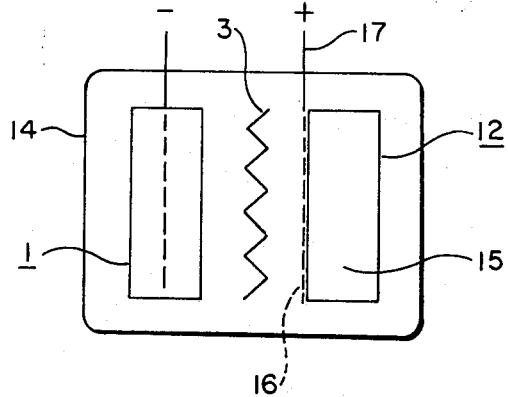
FIG. 4 is a symbolic representation of a rechargeable cell including the improved electrode structure of FIG. 3.

To further illustrate the invention, the placement of the electrode is shown symbolically in FIG. 4. As can be seen, the positive electrode 12 is positioned within the container 4 so that the current collector 16 is on the side of the electrode adjacent the separator 3. When the cell discharges, the metal reduced from the electrochemically active material 15 forms a layer on the surface of the electrochemically active material 15 facing separator 3 adjacent the current collector 16 and hence tends to reinforce the barrier between the electrochemically active material 15 and the separator 3. In this way, the present invention precludes the direct contact of electrochemically active 15 with the separator 3 thereby inhibiting separator attack.

As can be seen from the drawing of the improved electrode comprising the present invention in FIG. 3, the current collector 16 need not be continuous but, preferably, comprises a discontinuous configuration such as the mesh illustrated. Due to the openings in the current collector 16 there may still be a certain amount of contact between the electrochemically active material 15 and the separator 3. This is particularly true when the current collector 16 is composed of fine wires. However, as mentioned above, when the cell discharges, the metal reduced from electrochemically active material 15 will form a metallic layer over the surface of electrochemically active material 15 adjacent the current collector 16 and thereby reinforce the barrier action. This is possible in the practice of this invention because discharge of the electrochemical material (resulting in formation of reduced metal) occurs adjacent the collector. Thus, locating the collector on the surface of the electrochemically active material facing the separator results in formation of a metallic barrier at the interface between the separator and the electrochemically active material.

As was pointed out above, one problem resulting from separator attack is that it substantially reduces the effective shelf life of a rechargeable cell. The present invention can further be used to increase the effective shelf life if, after fully charging the cell, it is discharged for a brief period of time sufficient to build up a small layer of the metal reduced from the electrochemically active material (such as silver in a zinc-silver oxide cell) and therefore can completely preclude any direct contact between the electrochemically active material and the separator throughout the entire shelf life of the rechargeable cell.

While a particular embodiment of the present invention has been shown, it will be obvious to those skilled in the art that the novel construction of the positive electrode can be used in primary cells as well as secondary or rechargeable cells. Furthermore, it will be obvious to those skilled in the art that various changes may be made without departing from the invention in its broader aspects and it is, therefore, intended that the appended claims shall cover all such changes and modifications as fall within the true spirit and scope of the invention.

What I claim as new and desire to secure by Letters Patent of the United States is:

1. A method of inhibiting separator attack by the active materials of the positive electrode of a rechargeable cell comprising the steps of:
    a. positioning a metallic silver current collector on the surface of the positive electrode facing the separator;
    b. charging the rechargeable cell to a full charge; and
    c. forming a metallic barrier between the separator and the charged active material of the positive electrode by partially discharging the cell to reduce into metallic form active material adjacent the current collector.

2. The method of claim 1 wherein said electrode comprises silver.

* * * * *